United States Patent [19]
Coll-Cuchi

[11] Patent Number: 5,900,823
[45] Date of Patent: May 4, 1999

[54] VEHICLE PROTECTION SYSTEM WITH AUDIO/VISUAL ALARM AND AUXILIARY LOCK FOR STORAGE COMPARTMENT

[76] Inventor: E. J. Coll-Cuchi, c/o P.O. Box 6139, Loiza St. Station Santurce, Puerto Rico 00914

[21] Appl. No.: 08/866,074

[22] Filed: May 30, 1997

[51] Int. Cl.[6] ................................................ G06F 7/04
[52] U.S. Cl. ........................ 340/825.32; 340/825.31; 340/825.34; 307/10.3
[58] Field of Search .......................... 340/426, 825.32, 340/429, 460, 692, 693, 539, 561, 567, 825.31, 825.34; 307/10.1, 10.2, 10.3, 10.4, 10.5; 70/209, 164, 166, 226, 264, 63; 74/558, 558.5

[56] References Cited

U.S. PATENT DOCUMENTS

| | | |
|---|---|---|
| 2,041,325 | 5/1936 | De Lannoy . |
| 4,897,630 | 1/1990 | Nykerk ................................ 340/426 |
| 4,901,054 | 2/1990 | Waterman .......................... 340/426 |
| 4,958,142 | 9/1990 | Sayers ................................ 340/426 |
| 4,990,890 | 2/1991 | Newby ................................ 340/539 |
| 5,117,217 | 5/1992 | Nykerk ................................ 340/426 |
| 5,148,145 | 9/1992 | Tsao .................................... 340/429 |
| 5,193,141 | 3/1993 | Zwern ................................... 392/2 |
| 5,387,897 | 2/1995 | Bechtle et al. ..................... 340/426 |
| 5,451,926 | 9/1995 | Li ....................................... 340/426 |
| 5,463,595 | 10/1995 | Rodhall et al. ...................... 367/93 |
| 5,534,845 | 7/1996 | Issa et al. .......................... 340/425.5 |

Primary Examiner—Michael Horabik
Assistant Examiner—Jean B. Jeangland
Attorney, Agent, or Firm—Banner & Witcoff, Ltd.

[57] ABSTRACT

A vehicle protection system with an auxiliary locking device that automatically locks the storage compartment where to a storage compartment of the vehicle and audio and visual alarms when the engine is started while the protection system is activated. The system includes a case fixedly attached to the body of a car which has a display and a speaker. The speaker broadcasts a prerecorded message containing vehicle identifying information. Similarly, the display provides vehicle identifying information. This facilitates the reporting of the theft by witnesses and provides an additional incentive for the thief to abandon the automobile. The system may be activated remotely.

25 Claims, 5 Drawing Sheets

VEHICLE PROTECTION SYSTEM WITH AUDIO/VISUAL ALARM AND AUXILIARY LOCK FOR STORAGE COMPARTMENT

FIELD OF THE INVENTION

The present invention relates to vehicle protection system which emits an audio and/or visual alarm and provides an auxiliary lock to the engine compartment or the trunk when the system is activated.

BACKGROUND OF THE INVENTION

Vehicle theft is a well known problem that is perpetrated by amateur and professional criminals and vandals. To a thief, one of the most profitable methods of disposing with a stolen vehicle is to sell the engine components since these can often fetch more money collectively than the vehicle in one piece. Also, splitting the vehicle into components makes solving the crime more difficult for law enforcement authorities. Of course many thieves are after the vehicle itself, and others are after the contents of the storage compartment.

A multitude of alarm and deterrent systems to guard against vehicle theft have been introduced.

U.S. Pat. No. 5,193,141 to Zwern discloses a vehicle mounted system which permits a user to record desired phrases and to play back the recorded phrases through an audio system for entertainment, requesting assistance, or announcing conditions of the vehicle, including whether the vehicle has been disturbed.

U.S. Pat. No. 5,148,145 to Tsao discloses an automobile alarm device which, in response to the detection of a theft, alternately activates (i) a siren and (ii) a speech sound signal corresponding to the vehicle's license plate. The purpose of this device is to provide a distinct alarm signal so that the driver would know that the sound was coming from his vehicle.

U.S. Pat. No. 1,284,328 to Haynes et al. discloses a theft alarm system including a box mounted to the front of a car and another box mounted to the rear of the car. The front box has a lower portion with an audible alarm and an upper portion can indicate a visual "stolen" signal by illuminating a light behind a perforated plate. The rear box is similar to the upper portion of the front box and creates a visual "stolen" sign.

U.S. Pat. No. 4,901,054 to Waterman, U.S. Pat. Nos. 4,897,630 and 5,117,217 to Nykerk and U.S. Pat. No. 5,451,926 to Li all disclose vehicle alarm systems which include a voice synthesizer and/or voice generation circuits to inform the owner or occupant not to take further action in an attempt to deter theft and vandalism. Nykerk ('630 and '217) and Li include a transmitter or a dialer to contact the owner and/or third party.

U.S. Pat. No. 5,534,845 to Issa et al. discloses a complex vehicle security system having multiple audio, visual, and electronic output devices. The output devices can include sirens, synthesized and voiced outputs, the vehicle's head-, running and dome lights, dash mounted LEDs, and horn.

U.S. Pat. No. 2,041,325 to De Lannoy discloses an automobile distress signal. Upon activation by a driver stepping on a pedal the license plate pivots downwardly to disclose a "Help Police" sign and a card with a listing of various vehicle and owner information.

U.S. Pat. No. 5,463,595 to Rodhall et al. discloses a portable security device including a motion detector, illumination devices, audible devices, and a telephone dialer which all activate in response to an intruder. One audible device can play a message prerecorded by the user U.S. Pat. No. 4,958,142 to Sayers discloses a motor vehicle theft deterrent system which includes a high pitched siren and nozzles that spray an irritant onto the would-be thief.

U.S. Pat. No. 2,763,745 to Watts discloses a theft alarm system for vehicles which operates independently from the ignition system to send an alarm upon the opening of a front door of the vehicle.

While the prior alarm and deterrent systems provide audio and visual warnings, the warnings do not deter a thief from easily accessing the engine or trunk compartments.

SUMMARY OF THE INVENTION

Accordingly, the present invention provides a vehicle protection system with an auxiliary locking device for locking a storage compartment of the vehicle where the audio/visual alarm components of the system are located thus protecting them from tampering.

Briefly, the vehicle protection system includes a metal case which is fixedly attached to the outside body of a car, preferably the trunk or the hood. The case includes an owner's identification section where pertinent information such as the names and/or telephone numbers of the owner of the vehicle will appear upon system activation. The system also includes a speaker and features to facilitate broadcast of audio messages from the speaker inside the compartment.

Another aspect of the invention, the case further includes a system activation ON/OFF switch and a lever mounted to the switch such that the lever is rotated when the system is activated and deactivated. When the system is activated the lever physically engages a locking member positioning in the trunk to provide an auxiliary lock for the trunk to prevent tampering with the case and access to the contents of the trunk.

The presence of the case on the trunk of the vehicle can serve as a deterrent itself by warning would-be vandals and thieves that the vehicle is equipped with the vehicle protection system.

Yet another aspect of the invention is a recording playback device which provides an audio alarm by playing back a recording upon the detection of a then or possible theft of the vehicle. The recording identifies specific indicia of the vehicle such as the make, model, colors, etc. thus assisting authorities and bystanders in locating the exact vehicle.

In addition, the system is connected to blinking lights which will commence blinking to provide a visual indication of tampering with the vehicle, further facilitating identification of the vehicle.

Still another aspect of the of the present invention is the provision of an independent power source to the system so that once a theft has been detected, the audio alarm and visual indicators stay on even when the ignition is turned of or the vehicle has been abandoned.

In yet another aspect of the invention, the activation ON/OFF switch can be controlled remotely. Besides making use of the system more convenient under normal circumstances, this can be particularly useful if the owner is confronted with a car jacking situation. When confronted by a thief with threat of force the owner should surrender the vehicle and get out of harm's way. By enabling the vehicle protection system to be activated remotely, the owner will be out of danger and while the stolen vehicle is being driven away, the owner can activate the system.

These and other features and advantages of the invention may be more completely understood from the following detailed description of the preferred embodiments of the invention with reference to the accompanying drawings.

DETAILED DESCRIPTION OF THE PREFERRED EMBODIMENTS

Figure 1:
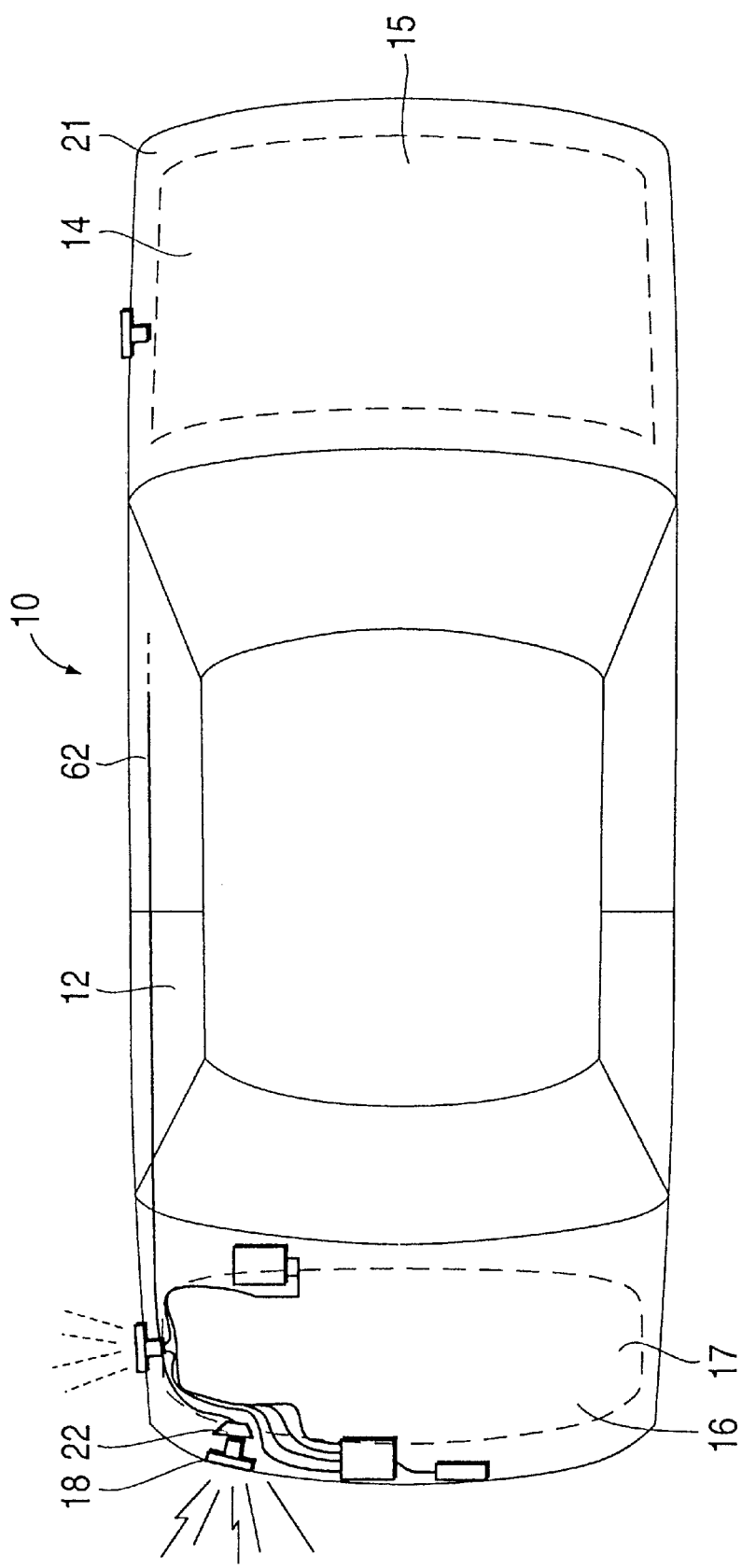
FIG. 1 is a top plan schematic diagram of the vehicle protection system installed in a vehicle, in accordance with the present invention.
Figure 2:
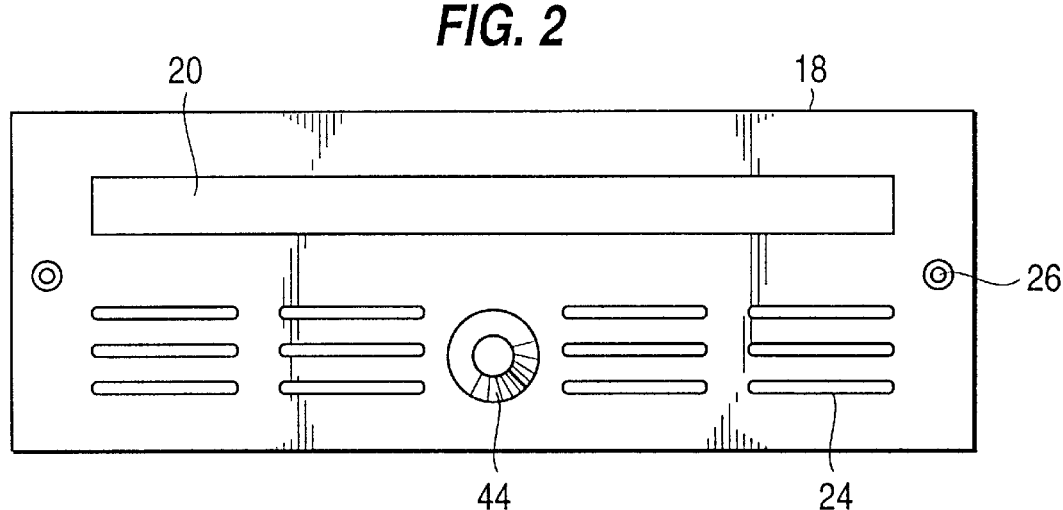
FIG. 2 is a front elevational view of the case mounted on the vehicle.

Referring to FIG. 1, vehicle 10 generally has a passenger compartment 12, a front storage compartment 14 with a hood 15 which normally contains the engine, and a rear storage compartment or trunk 16 with a lid 17. In the preferred embodiment as shown in FIG. 1, a metal case 18 is mounted to the body of the vehicle at trunk 16. Case 18 is shown in detail in FIG. 2, and case 18 would be mounted so that the front view as in FIG. 2 would be visible at the rear of the vehicle. Case 18 includes a display 20, which can display identifying information of the owner of the vehicle. The case also includes vents 24 which can help sound from a speaker 22 mounted to the inside of the vehicle to be protected.

Figure 3:
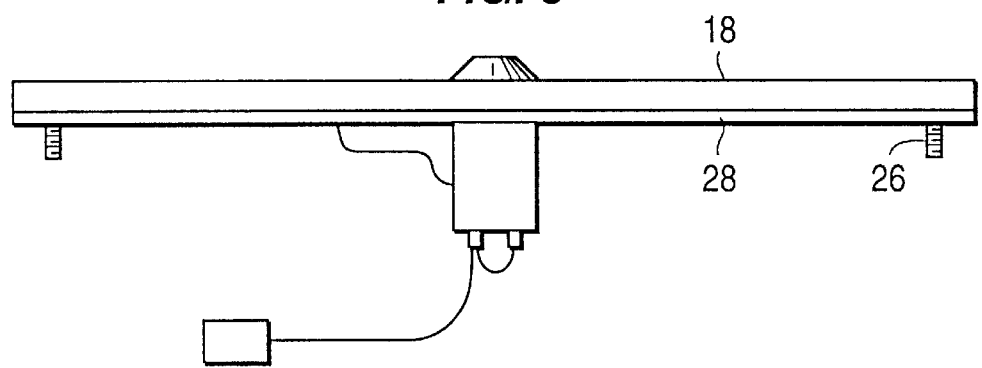
FIG. 3 is a top plan view of the case shown in FIG. 2.

Case 18 is mounted onto the vehicle by inserting threads 26 into appropriate holes (not shown) in the vehicle body and securing with nuts (not shown). A sealing gasket 28 extends around the periphery of case 18 so as to seal the junction of case 18 and the vehicle body, FIG. 3.

A latch or lock that is installed by the vehicle manufacturer is standard on all vehicles to lock the trunk and the engine compartment. While the system is described herein as being installed to the rear storage compartment or trunk of the vehicle, it will be understood that the case could be installed in one or both storage compartments.

Figure 4:
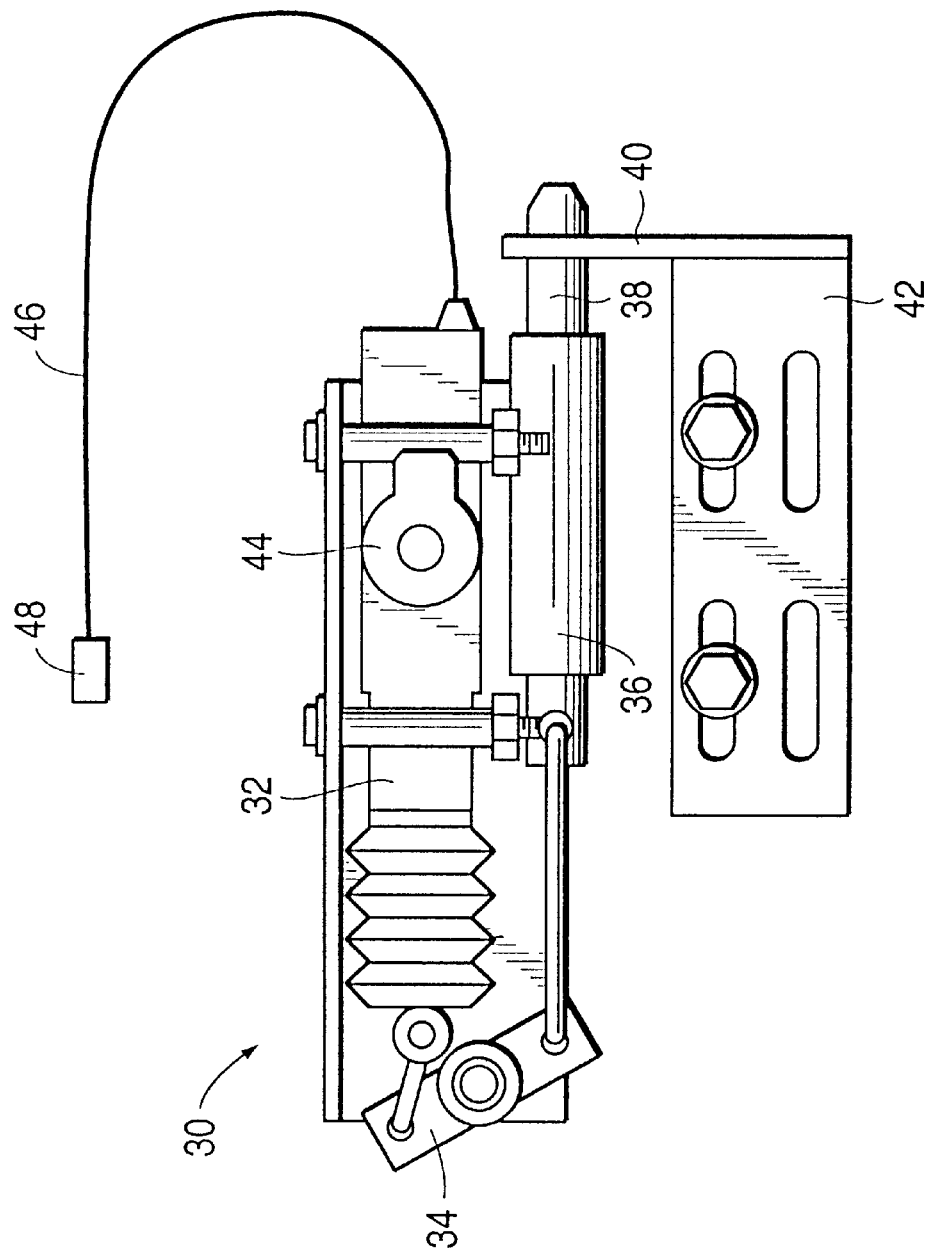
FIG. 4 illustrates the double lock assembly of the present invention with the actuator shown engaging a latch.

One aspect of the vehicle protection system is the provision of an auxiliary lock 30 for the storage compartment which provides an extra measure of security with the factory installed lock or latch. FIG. 4 illustrates auxiliary lock assembly 30 to be installed in a storage compartment. Auxiliary lock assembly 30 comprises an actuator 32, a pivoting connector 34, a plunger 36 and a rod 38 which engages an appropriate slot or aperture (not shown) in retaining plate 40. Retaining plate 40 is mounted within the storage compartment by bracket 42. Key switch 44 physically actuates actuator 32 of the lock assembly and also activates the controller for the system. When key switch 44 is turned to an ON position, actuator 32 moves connector 34 an appropriate distance to thereby actuate plunger 36. Rod 38 is then moved into secure engagement with a slot in retaining plate 40. Of course the retaining plate and the key switch are positioned on opposing portions of the storage compartment, that is, one on the inside of the compartment lid and the other within the compartment so that when the auxiliary lock is engaged, the compartment lid cannot be opened regardless of the condition of the factory installed lock. In this manner, when the system is activated by the key, auxiliary lock assembly 30 is physically actuated to secure the compartment lid and prevent it from being opened.

Figure 5:
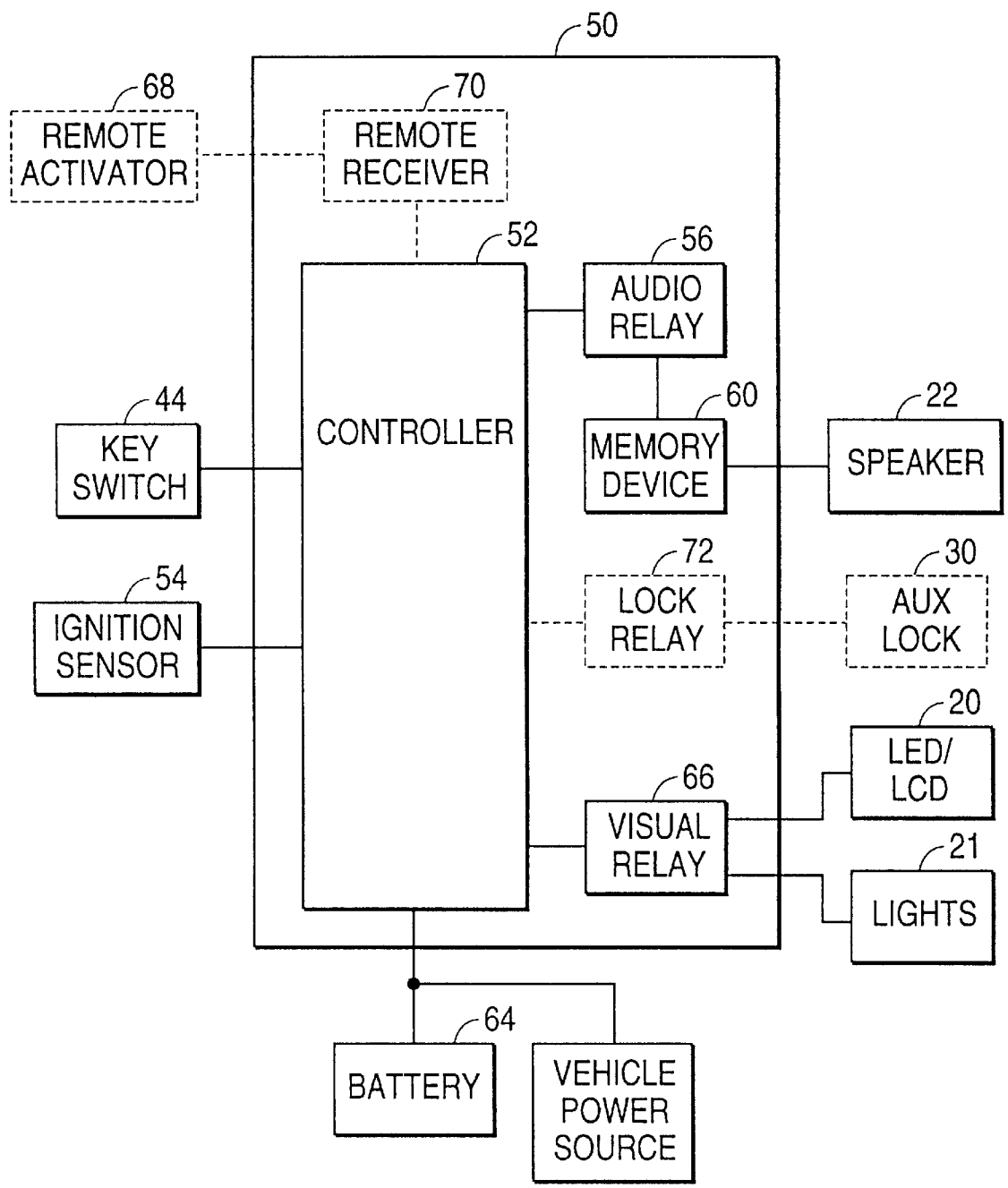
FIG. 5 is a block diagram of the vehicle protection system of the present invention.

Key switch 44 also activates the logic control circuitry of the vehicle protection system, and FIG. 4 illustrates a cable 46 and a plug 48 which provides an input to a logic module 50. Logic module 50 is illustrated in a block diagram in FIG. 5 and comprises a logic controller 52 and a plurality of inputs and outputs. The ON/OFF input of key switch 44 activates and deactivates the system. The system is normally powered by the vehicle power source, and cable 62 in FIG. 1 shows the wiring schematically. When the system is activated, auxiliary lock is engaged, and the audio and visual alarms are triggered via ignition sensor 54 when the engine is started. Physically, ignition sensor 54 is connected to the vehicle battery and senses the surge that occurs when the car is started.

When the engine is started while the system is activated, audio relay 56 and visual relay 58 activate the alarm systems. The audio alarm consists of a prerecorded message which is stored in a memory device 60 and broadcast through speaker 22. Instead of a simple loud noise or siren, a prerecorded message with identifying indicia will get the attention of bystanders and police and will help witnesses to provide an accurate description of the stolen vehicle. The message provides a description of the stolen vehicle. The message is preferably recorded during installation. A sample message for the system is as follows:

Attention Police. This car has been stolen. It is a Buick, four doors, white and blue. Virginia License Plate Number ABC-123.

The message will repeat and the system will continue broadcasting the message even if the ignition is turned off in the car due to the provision of an independent battery 62. Of course the message could convey a variety of other information. Speaker 22 is preferably mounted in or near case 18, and the speaker is loud enough to be heard within a predetermined radius.

The vehicle protection system also provides visual alarms via visual relay 66 when the engine is started while activated. Similar to the audio alarm, one of the visual indicators provides useful information to witnesses and police regarding the stolen vehicle. This display 20 on case 18 preferably displays such information as the vehicle identification number (VIN) or the telephone number of the owner. In addition to the information displayed here, the alarm can include making the vehicle lights 21 flash and only entails connecting the vehicle lights to the logic module for this desired output.

Figure 6:
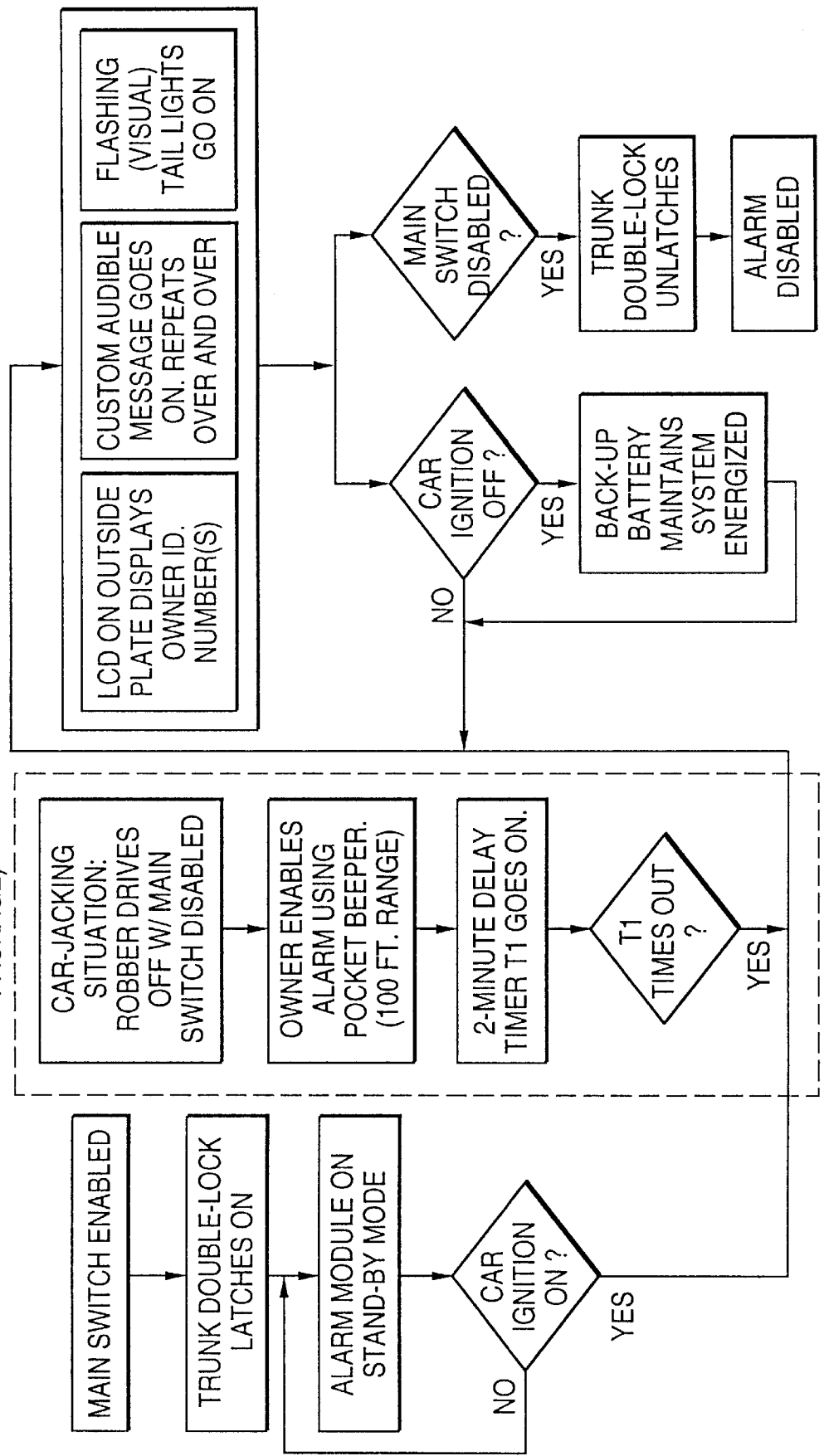
FIG. 6 is a flow diagram illustrating the operation of the vehicle protection system.

The flow diagram of FIG. 6 illustrates the logic control circuitry for the system.

In another preferred embodiment, the system is activated remotely by a remote control 68 which transmits a signal to a receiver 70 which provides the ON/OFF input to the controller. When the system is activated remotely, the logic control circuitry provides a lock relay 72 to actuate auxiliary lock 30. The components of the system required for remote activation are shown in broken line in FIG. 5. Similarly, the flow diagram of FIG. 6 shows the remote activation operation bounded by dotted lines.

Remote activation may be desirable for convenience or safety reasons. Activating the system after parking the car by a remote control would be quicker and more convenient than using key switch 44. As a safety measure, with the increase in car jacking crimes, the system provides the owner with a chance to surrender the vehicle to a car jacker without being harmed. Once the vehicle has been driven away and the owner is out of harm's way, the vehicle protection system can be activated so that the auxiliary lock is actuated and the audio and visual alarms are going off while the car jacker is driving. Because of the independent battery provided in the system, even if the thief turns the ignition of or cuts the wire to the vehicle's battery, the alarms will continue to increase the chances of detection and recovery.

Although the present invention has been illustrated in terms of preferred embodiments, it will be evident that numerous changes, adaptations, and modifications may be made without departing from the scope of the invention which is to be limited only by the appended claims.

I claim:

1. A vehicle protection system for use with a vehicle having a longitudinal axis, a passenger compartment, a storage compartment spaced from the passenger compartment along the longitudinal axis, a lid member movable between a closed position in which the lid member covers the storage compartment and an open position in which the lid member permits access to articles inside the storage compartment, a factory installed lock for locking the lid member in the closed position, the vehicle protection system comprising:

an activation/de-activation switch;

a controller disposed inside the vehicle and coupled to said switch;

a sensor which senses unauthorized activity with the vehicle when said system is activated; and a lock independent of the factory installed lock, coupled to said switch for securely locking the lid member in the closed position when said system is activated and preventing the lid member from being moved to the open position.

2. The vehicle protection system of claim 1, wherein the vehicle includes a power source, said vehicle protection system further comprising a battery for powering said system independent of the vehicle power source.

3. The vehicle protection system of claim 1, further comprising an indicating device for indicating detection of unauthorized activity with the vehicle, wherein said indicating device is a visual indicator.

4. The vehicle protection system of claim 3, wherein said visual indicator comprises a display disposed on the vehicle.

5. The vehicle protection system of claim 4, wherein said display displays vehicle identification information.

6. The vehicle protection system of claim 3, wherein said visual indicator comprises an LED.

7. The vehicle protection system of claim 3, wherein said visual indicator comprises flashing lights on said vehicle.

8. The vehicle protection system of claim 1, further comprising an indicating device for indicating detection of unauthorized activity with the vehicle, wherein said indicating device is an audio indicator.

9. The vehicle protection system of claim 8, wherein said audio indicator comprises a recorded playback device and speaker to broadcast a prerecorded message.

10. The vehicle protection system of claim 9, wherein said prerecorded message includes vehicle identifying information.

11. The vehicle protection system of claim 8, wherein said audio indicator comprises a speaker.

12. The vehicle protection system of claim 1, wherein said switch is remotely actuated.

13. The vehicle protection system of claim 1, wherein said lock is spaced from the factory installed lock.

14. The vehicle protection system of claim 1, further comprising a case externally mounted to the storage compartment having an indicating device coupled to said controller.

15. A vehicle with a vehicle protection system comprising:

a vehicle, said vehicle having a longitudinal axis, a passenger compartment, a storage compartment spaced from the passenger compartment along a longitudinal axis, and a lid member movable between a closed position in which the lid member covers the storage compartment and an open position in which the lid member permits access to articles inside the storage compartment;

a factory installed lock for locking the lid member in the closed position;

an activation/de-activation switch for said vehicle protection system;

a controller coupled to said switch, said controller disposed within said vehicle;

a security case, said security case externally mounted to said storage compartment and including an indicating device coupled to said controller; and an auxiliary lock, independent of said factory installed lock, coupled to said switch for securely locking the lid member in the closed position and preventing the lid member from being moved to the open position when said system is activated.

16. The vehicle of claim 15, wherein said indicating device of said vehicle protection system is a visual indicator.

17. The vehicle of claim 16, wherein said visual indicator comprises a plurality of colored visual displays.

18. The vehicle of claim 16, wherein said visual indicator comprises an LCD display.

19. The vehicle of claim 18, wherein said display displays vehicle identifying information.

20. The vehicle of claim 15, wherein said indicating device of said vehicle protection system is an audio indicator.

21. The vehicle of claim 20, wherein said audio indicator comprises a speaker disposed in said security case, a media storage device and a playback device for playing a stored message.

22. The vehicle of claim 21, wherein said stored message includes vehicle identifying information.

23. The vehicle of claim 15, wherein said storage compartment is disposed forward from said passenger compartment.

24. The vehicle of claim 15, wherein said storage compartment is disposed rearward of said passenger compartment.

25. The vehicle of claim 15, wherein said factory installed lock is spaced from said auxiliary lock.

* * * * *